United States Patent [19]

Wada et al.

[11] Patent Number: 5,225,953
[45] Date of Patent: Jul. 6, 1993

[54] MAGNETIC THIN FILM HEAD OF A SINGLE MAGNETIC POLE FOR PERPENDICULAR RECORDING AND REPRODUCTION

[75] Inventors: Toshiaki Wada; Akio Murata; Hideki Mine, all of Suita, Japan

[73] Assignee: Sumitomo Special Metal Co., Ltd., Osaka, Japan

[21] Appl. No.: 817,818

[22] Filed: Jan. 8, 1992

Related U.S. Application Data

[63] Continuation of Ser. No. 433,748, Nov. 9, 1989, abandoned.

[51] Int. Cl.$^5$ .............. G11B 5/147; G11B 5/187; H01F 7/06
[52] U.S. Cl. .............. 360/126; 360/122; 29/603
[58] Field of Search .............. 360/119–126; 29/603

[56] References Cited

U.S. PATENT DOCUMENTS

| | | | |
|---|---|---|---|
| 4,752,850 | 6/1988 | Yamada et al. | 360/126 |
| 4,799,118 | 1/1989 | Yamada et al. | 360/119 |
| 4,843,507 | 6/1989 | Schewe et al. | 360/119 |
| 4,855,854 | 8/1989 | Wada et al. | 360/126 |
| 4,863,557 | 9/1989 | Kokaku et al. | 360/122 |
| 4,872,079 | 10/1989 | Roberts | 360/122 |
| 4,953,051 | 8/1990 | Wada et al. | 360/126 |
| 5,081,554 | 1/1992 | Das | 360/126 |

Primary Examiner—Stuart S. Levy
Assistant Examiner—Jefferson Evans
Attorney, Agent, or Firm—Watson, Cole, Grindle & Watson

[57] ABSTRACT

A perpendicular magnetic recording/reproducing thin film head of the single pole type formed of a magnetic member provided on its main surface with a grooved portion, and a non-magnetic material filled in the grooves of the grooved portion, thin film conductor coils, an inter-layer insulation film and a main magnetic pole film, wherein at least the thin film conductor coils, the inter-layer insulation film and the main magnetic pole film are laminated on the magnetic member to form a return path. The magnetic member and the main magnetic pole film are connected at the return path and the thin film head has an exposed laminated end face adapted to be opposed to a recording medium and the magnetic member forming a return path appears on the exposed laminated end face and is formed with a portion having the same width as that of the main magnetic pole film and arranged in parallel with the main magnetic pole film and the remaining portions other than the parallel portion are arranged in non-parallel relationship with the main magnetic pole film.

16 Claims, 10 Drawing Sheets

MAGNETIC THIN FILM HEAD OF A SINGLE MAGNETIC POLE FOR PERPENDICULAR RECORDING AND REPRODUCTION

RELATED INVENTIONS

This invention is a continuation application of application Ser. No. 433,748, filed Nov. 9, 1989, and now abandoned.

BACKGROUND OF THE INVENTION

1. Field of the Invention

The present invention relates to an improvement in perpendicular magnetic recording/reproducing thin film heads of a single magnetic pole type which are used for electronic computers, magnetic tapes, video recording, etc. More particularly, it relates to a perpendicular magnetic recording/reproducing thin film head of a single magnetic pole type and having improved cross-talk and off-track properties of the thin film magnetic head by shaping a magnetic member for a return path filled with non-magnetic material and placed at a position opposing a magnetic recording medium after fabrication. The assembly is such that the width of the magnetic member for the return path, disposed in parallel with a main magnetic pole film, is substantially equal to the width of the main magnetic pole film. The magnetic member for the return path other than the parallel portion of the magnetic member is not in parallel with the main magnetic pole film.

2. Realted Art

Generally, a perpendicular magnetic recording/reproduction thin film head (hereinafter simply referred to as a magnetic thin film head) is suitable for higher density magnetic recording since the size of the magnetic circuit is small and a magnetic thin film of high permeability and high saturation magnetic flux density is used. Further, since it can be manufactured by a production process based on semiconductor technology, a highly accurate magnetic head can be produced at a reduced cost. It is therefore considered that such a thin film head will become a significant component in perpendicular magnetic heads.

The magnetic thin film head includes, for example, an inductive head used as a recording/reproducing head and a magnetoresistive effect head used as a reproducing head, or other similar magnetic component.

Figure 8A:
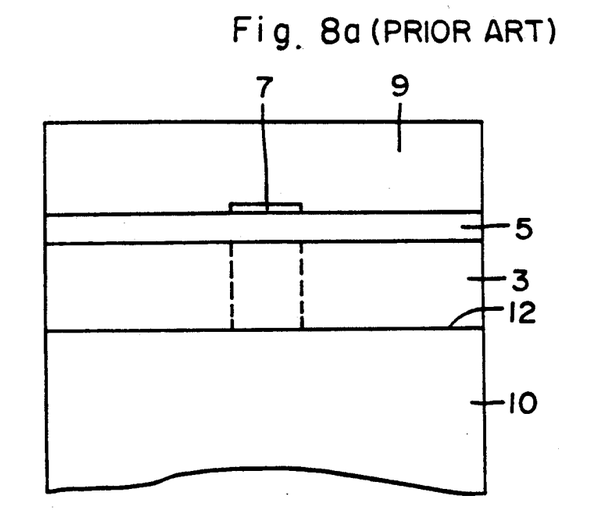
FIGS. 8a and 8b are, respectively, explanatory views for the front elevation and the vertical cross-section of the conventional magnetic thin film head using a magnetic member.
Figure 8B:
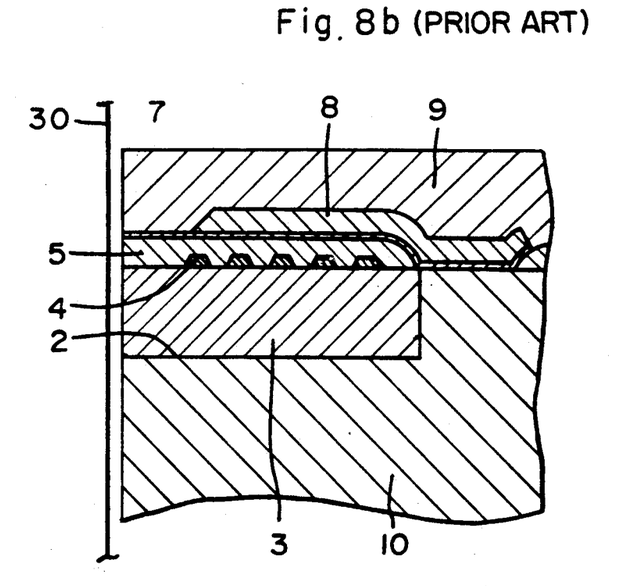

As shown in FIGS. 8a and 8b, which are explanatory views for the medium-opposing face and a vertical cross section of a transducer of a thin film head, and inductive head for a perpendicular magnetic recording/reproduction comprises, for example, a magnetic member 10, for example, made of soft ferrite, a main magnetic pole film 7 made of permalloy, senduct or Co-based amorphous material disposed with respect to the member 10 by a non-magnetic member 3 as a gap-layer, thin film conductor coils 4 and an insulation layer 5, a thick magnetic film 8, for preventing magnetic saturation of the main magnetic pole film 7 upon recording, and a protective film 9.

In the perpendicular thin film head of a construction opposed at the exposed laminated end face to a recording film, since a boundary 12, between the magnetic member 10 for the return path to a recording medium 30 and non-magnetic member 3 filled in a groove 2 of the magnetic member 10, is in parallel with the main magnetic pole film 7, the cross-talk property and the off-track property are not sufficient due to the unwanted reproduction in adjacent tracks at the boundary 12 other than the portion below the main magnetic pole film 7 and, accordingly, there has been a problem with increasing track density.

Additionally, in the conventional magnetic thin film head, since an edge-like portion of the magnetic member for the return path, that is, the boundary 12, is exposed in addition to the main magnetic pole film at the surface opposed to the recording medium, and magnetic flux leakage from the recovering medium are concentrated to the edged portion due to the contour effect of the exposed portion, there has been a problem of a resulting waveform distortion and deterioration in the recording density property due to the development of a side signal peak (the peak due to the contour effect) other than the main signal peak.

SUMMARY OF THE INVENTION

It is, accordingly, an object of the present invention to provide a magnetic thin film head in which the cross-talk and off-track properties occurring in usual magnetic thin film heads are improved and capable of reducing and overcoming the problems due to the "contour effect".

Figure 1A:
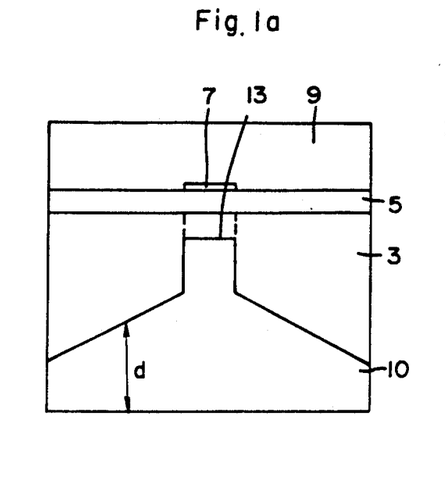
FIGS. 1a and 1b are, respectively, explanatory views for the front elevation and the vertical cross section of a thin film magnetic head according to the present invention.
Figure 2A:
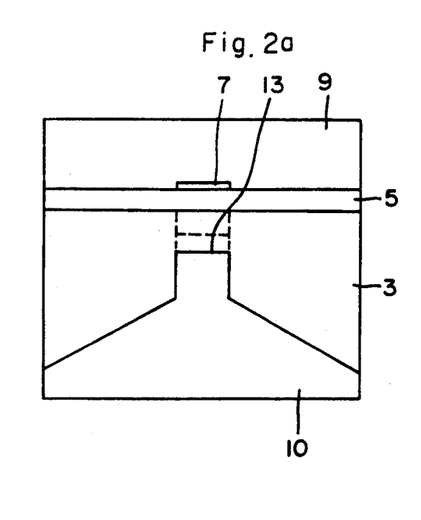
FIGS. 2a and 2b are, respectively, other embodiments for the front elevation and the vertical cross-section of a thin film magnetic head according to the present invention.

In order to reduce the output reproduced from adjoining tracks arranged at a contact portion of the magnetic members for the return path with the non-magnetic material, thereby improving the cross-talk property and the off-track property, the present inventors have made various studies on the configuration of the magnetic member for the return path. It has been found that when the magnetic member for the return path, as viewed from its surface opposed to the magnetic recording medium, is configured as shown in FIG. 1a or 2a (illustrating the front view of a laminated end face of the magnetic thin film head) such that a portion of the magnetic member for the return path having the same width as that of the main pole film is parallel with the main pole film and the remaining portion of the magnetic member for the return path (other than the above-mentioned parallel portion) to be non-parallel with the main pole film so as to be slanted, i.e. to gradually decrease to a thickness (d) of the magnetic member for the return path toward the both sides thereof starting from the lowest part of the parallel portion, the thus configured magnetic member for the return path can increase in azimuth cross-section due to its slanted portions, thereby improving the cross-talk and off-track properties of the magnetic thin film head.

It has also been found that the deterioration of waveforms due to the concentration of magnetic fluxes at the crossing corners between the magnetic member for the return path and the non-magnetic material can be prevented by making a predetermined inner surface of a groove disposed in the magnetic member a specific step-width shape in view of a vertical cross-sectional side elevational view.

That is, the present invention concerns a perpendicular magnetic recording/reproducing thin film head (hereinafter simply referred to as a thin film head) preferably of the single pole type in which grooves are provided on one main surface of a magnetic member for the return path, non-magnetic material is filled in the grooves to form at least thin film conductor coils, an inter-layer insulation film and a main magnetic pole film are laminated on the magnetic member. The magnetic member and the main magnetic pole film are connected at the return path and they are in opposing relationship with a recording medium at the laminated end face, wherein the width of the magnetic member for the return path in parallel with the main magnetic pole at the laminated end face in the surface opposed to a medium is substantially equal to the width of the main magnetic pole film, and the portion of the magnetic member for the return path other than the parallel portion of the magnetic member is disposed not to be in parallel with the magnetic pole film.

BRIEF DESCRIPTION OF THE DRAWINGS

FIGS. 4h to 4k are perspective views showing the step subsequent to that of FIG. 4g;

DETAILED DESCRIPTION OF THE INVENTION

Figure 3A:
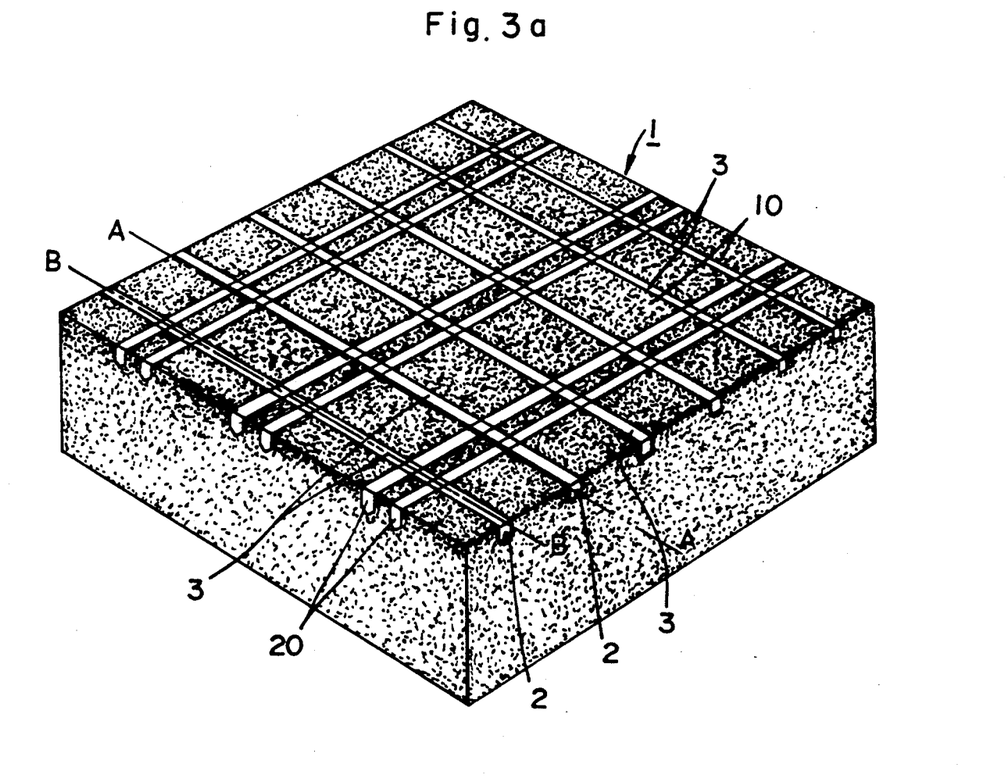
FIGS. 3a and 3b are perspective views for the illustration of a magnetic substrate according to the present invention.
Figure 3B:
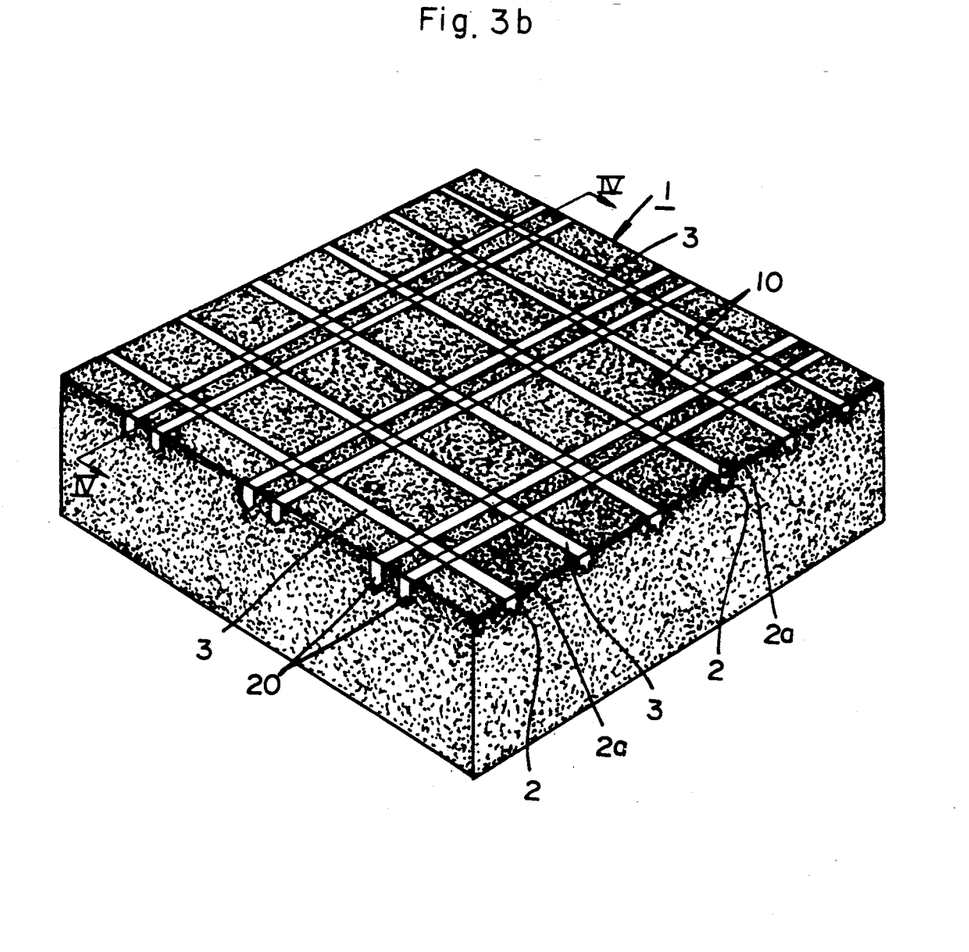

As shown in FIGS. 3a and 3b, a thin film head according to the present invention can be manufactured easily and efficiently by using a magnetic substrate 1, comprising a plurality of grooves 2, each having a flat bottom or stepwise shape, and grooves 20 each of a V or substantially U-shaped configuration perpendicular to the grooves 2, which are disposed at a predetermined interval on one main surface of magnetic material such as Ni—Zn Mn—Zn ferrite and filled with non-magnetic material 3 such as glass, $SiO_2$, $Al_2O_3$ or barium titanate.

Figure 1B:
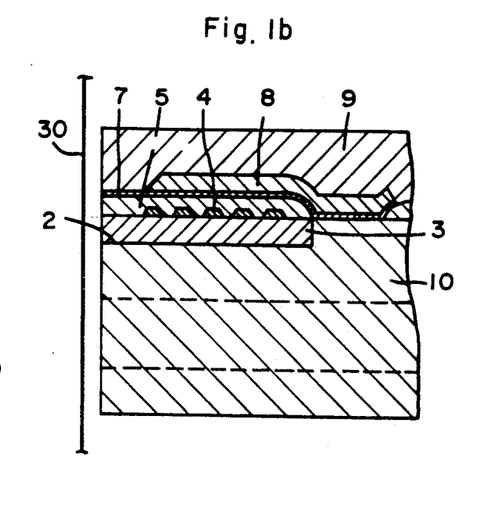

Referring more specifically, as shown in FIGS. 1a and 1b, the bottom of the groove at a position opposed to the magnetic recording medium, that is, a portion where the groove 2 and the groove 20 intersect each other in the magnetic substrate 1 of a grooved structure as shown in FIG. 3, is shaped such that the width of the upper portion 13 of the magnetic member for the return path is made substantially equal with the width for the main magnetic pole 7 and the magnetic member 10 other than the parallel portion 13 of the magnetic member is so disposed as not to be in parallel with the main magnetic pole film. For this purpose, the thickness (d) of the magnetic member 10 other than the parallel portion 1 of the magnetic member is gradually reduced from the upper portion 13 of the magnetic member, by which the azimuth cross-section can be increased by the inclined surface of the magnetic member, to improve the cross-talk property and the off-track property of the thin film head.

Figure 2B:
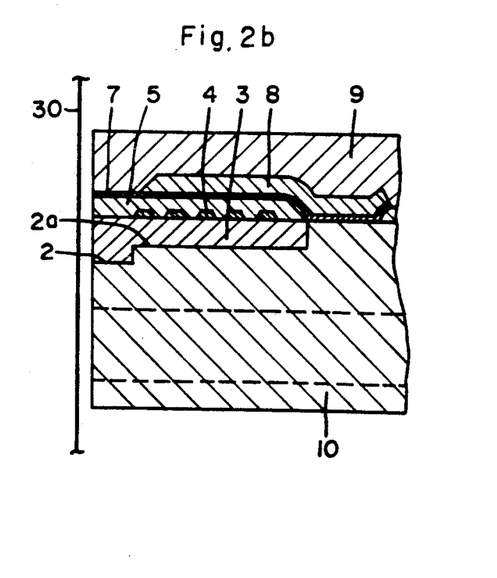
Figure 6A:
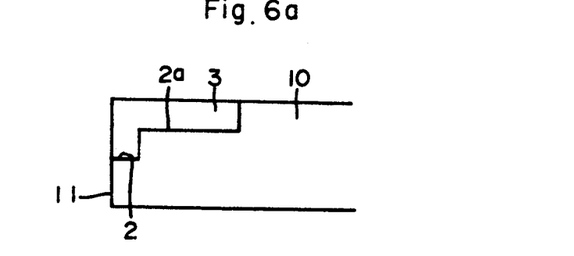
FIGS. 6a to 6c are, respectively, explanatory views illustrating the shape of the grooves in the magnetic member.
Figure 6B:
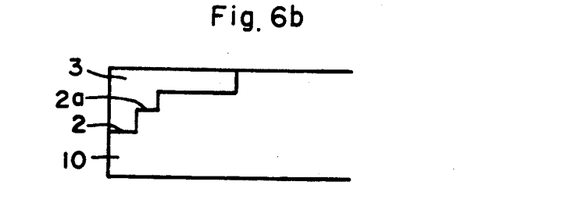
Figure 6C:
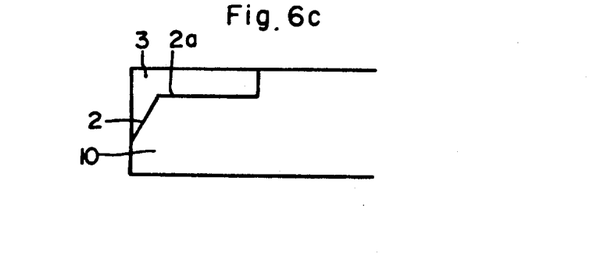

Further, as shown in FIGS. 2a and 2b, by forming the groove 2 to have a stepwise inner face 2a, for example, as various step-like shapes shown in FIGS. 6a to 6c, since the magnetic flux leaked from the recording medium are dispersed by at least one intersecting corner between the surface of the magnetic member 10 exposed at the surface opposing to the medium, and the non-magnetic material 3 is filled in the groove 2 and the surface of contact with the non-magnetic material 3, the sub peak drawback due to the contour effect in the conventional magnetic thin film head of the single pole type can be reduced.

Steps in the manufacture of the magnetic thin film according to the present invention are described with respect to FIGS. 3b and FIGS. 4a to 4g.

(1) To one main surface of the magnetic material, namely substrate 1 made of Ni—Zn or Mn—Zn ferrite, a plurality of grooves 2 each having a stepwise inner surface 2a and a plurality of grooves 20 each having a substantially U-shaped configuration perpendicular to the grooves 2 are disposed in a desired pattern. Non-magnetic material 3, such as glass, $SiO_2$, $Al_2O_3$, barium titanate, etc. is filled in each of the grooves 2 and 20 and, thereafter, mechanochemical polishing is applied to the main surface of the magnetic substrate 1 formed with the grooves 2 and 20 (reference FIG. 3b).

Figure 4A:
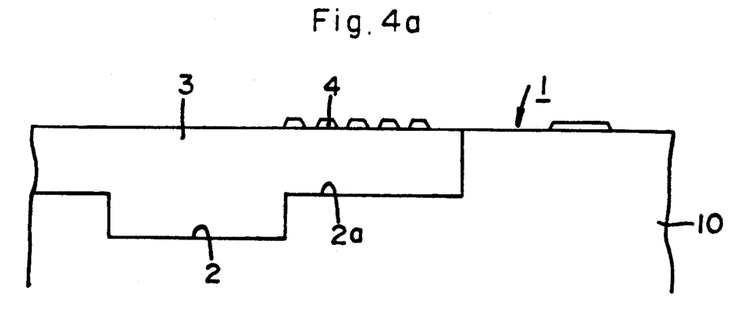
FIGS. 4a to 4g are, respectively, explanatory views taken along line IV—IV of FIG. 3b for illustrating the production steps of the thin film magnetic head according to the present invention.

(2) Thin film conductor coils 4 made of Au, Cu, Cr, Al, etc., are formed in the ground surface of the thus partitioned magnetic member 10 (refer to FIG. 4a). If the magnetic member is Mn—Zn ferrite, an insulation layer is disposed on a non-magnetic member before forming the thin film conductor coils.

Figure 4B:
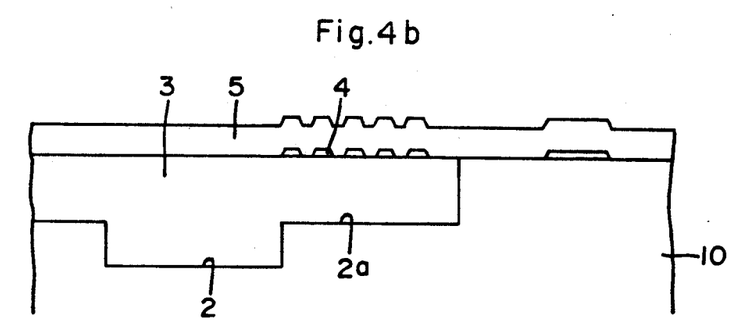

(3) An inter-layer insulation film 5 made of inorganic oxide film such as $SiO_2$ or $Al_2O_3$ is formed by means of sputtering, etc., as electrical insulation between the layer of the thin film conductor coils 4 and the main magnetic pole film 7 to be deposited subsequently (refer to FIG. 4b).

Figure 4C:
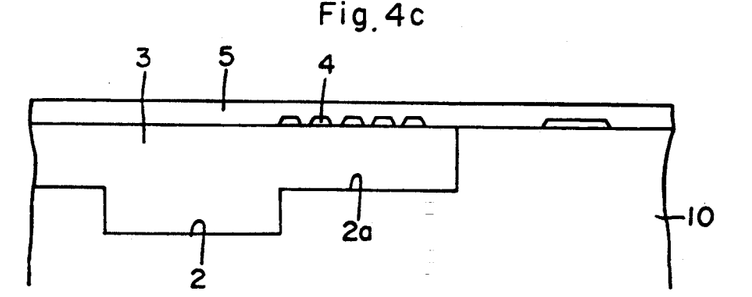
Figure 4D:
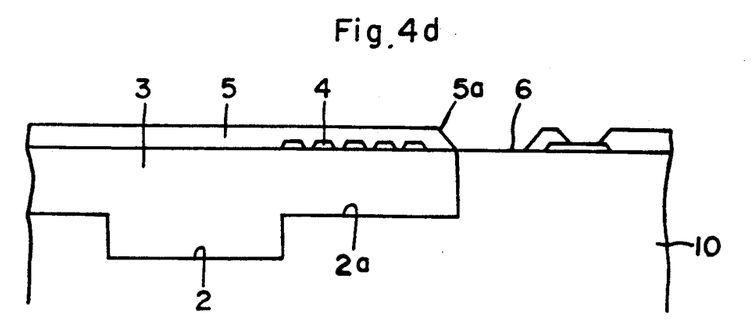

(4) Precision polishing such as diamond polishing is applied for removing any unevenness on the inter-layer insulation film 5 caused by the thin film conductor coils 4 to flatten the surface to less than 500 Angstrom of roughness (refer to FIG. 4c).

(5) A return path 6 for connecting the main magnetic pole film 7 deposited by the subsequent step and the magnetic member 10 is formed on the inter-layer insulation film 5 by means of ion etching, chemical etching, etc. (refer to FIG. 4d).

(6) For removing the deformed layer at the surface of the inter-layer insulation film 5, and removing the corners for the edged portion 5a and, further, removing the deformed layer at the surface of the magnetic member 10, mechanochemical polishing is applied to the entire main surface.

Thus, fabrication strains are removed from the surface of the inter-layer insulation film 5 and the surface of the magnetic member 10 at the return hole 6 to attain a strain free state and they are finished to a surface roughness of less than 100 Angstroms, preferably, less than 40 Angstroms.

Figure 4E:
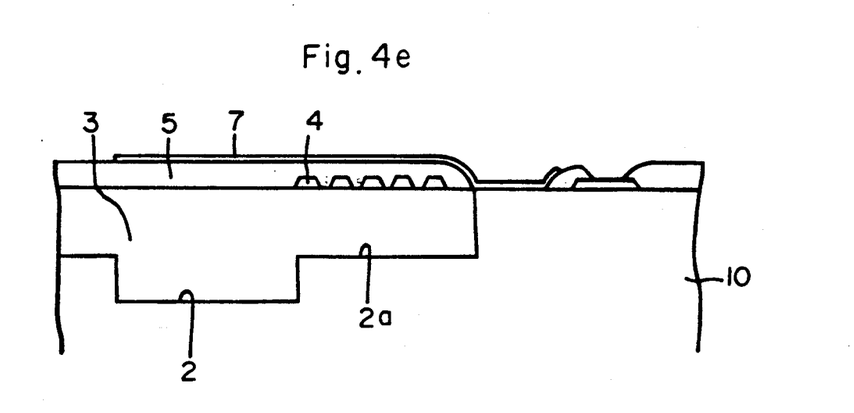

(7) After the mechanochemical polishing the main magnetic pole film 7 made of Fe-based alloy, such as permalloy and sendust or amorphous material, is deposited on the surface of the inter-layer insulation film 5 and the surface of the magnetic member 10 at the return path 6 by means of sputtering, vapor deposition or plating, followed by patterning (refer to FIG. 4e).

Figure 4F:
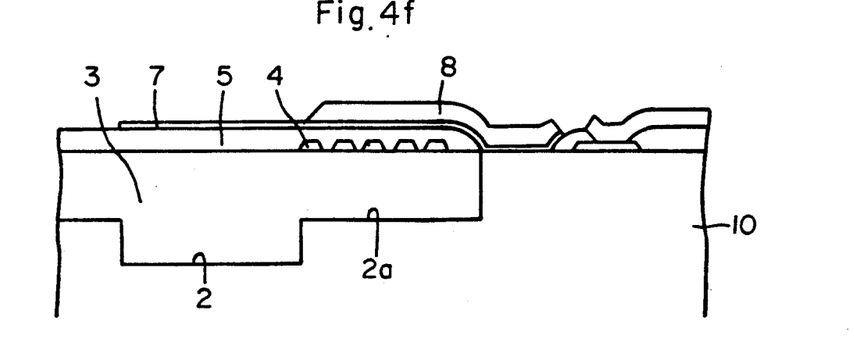

(8) Subsequently, a thick main magnetic pole film 8 is deposited on the surface of the main magnetic pole film 7 by means of sputtering, vapor deposition, plating, etc. for preventing magnetic saturation, and then patterned (refer to FIG. 4f).

Figure 4G:
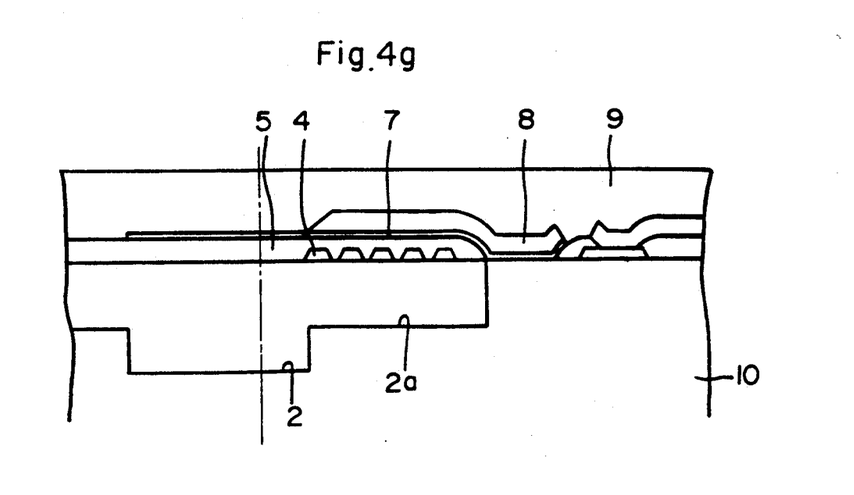

(9) A head protection film 9 is laminated over the main magnetic pole film 8 (refer to FIG. 4g).

Figure 4H:
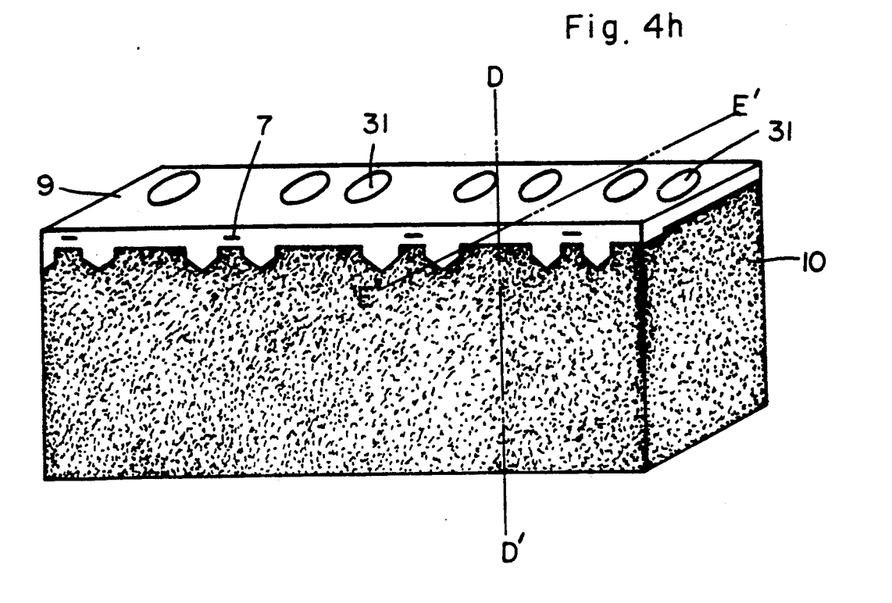
Figure 4J:
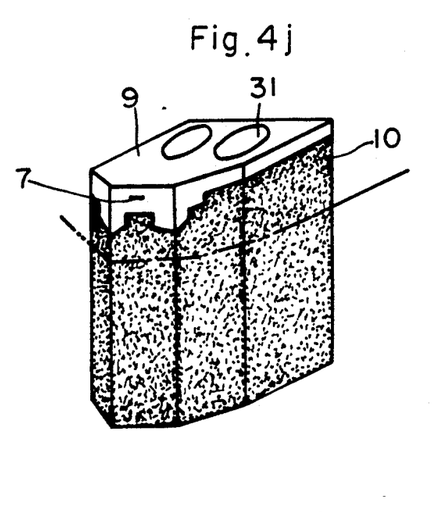
Figure 4K:
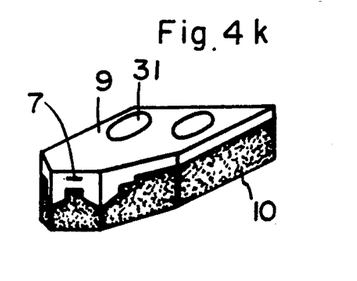
Figure 4L:
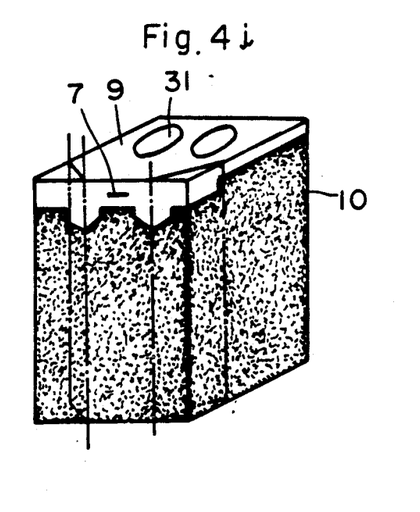

(10) Then, the substrate is cut at predetermined positions of the grooves 2 and at predetermined positions of the grooves 20. For example, it is cut along lines A—A' and B—B' in FIG. 3a to obtain a piece as shown in FIG. 4h, which is then cut along lines E—E' and D—D' in FIG. 4h to obtain a small piece as shown in FIG. 4i and further tapered and then prepared into a thickness as shown in FIG. 4h. Thus, a thin film magnetic head as shown in FIGS. 4h to 4k is obtained, having a stepwise inner surface 2a in the groove 2 of the magnetic member, and in which the shape at the intersection between the groove 2 and groove 20, that is, the surface opposed to the recording medium is formed such that the width of the parallel portion 13 of the magnetic member for the return path is substantially equal with the width of the main magnetic pole film 7 and the thickness of the magnetic member 10, other than the parallel portion 13 of the magnetic member, reduced from the surface of the parallel portion 13 of the magnetic member (FIG. 2). In FIGS. 4h to 4k, 31 represents an electrode.

Figure 5A:
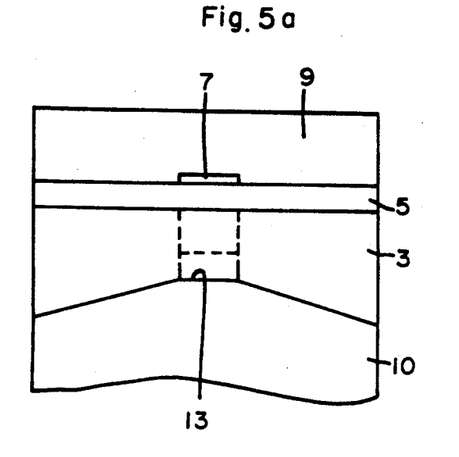
FIGS. 5a and 5b are, respectively, other embodiments for the front elevation and the vertical cross-section of a thin film magnetic head of the single pole type according to the present invention.
Figure 5B:
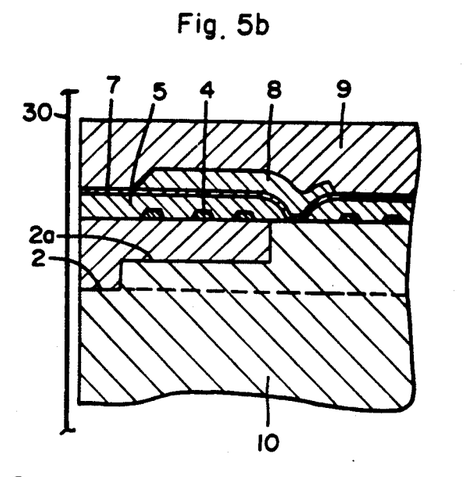

The magnetic member for the return path at the end face of the lamination opposed to the recording medium may have a shape as shown in FIG. 1 or FIG. 2, as well as that shown in FIG. 5.

That is, by using the magnetic substrate 1 of the grooved structure in which the stepwise grooves 2 and substantially U-shaped grooves 20 perpendicular thereto are each disposed at a predetermined interval, a shape as shown in FIG. 2 can be obtained in which the width of the parallel portion 13 of the magnetic member 10 for the return path is substantially equal with the width of the main magnetic pole film 7. The thickness of the magnetic member 10 at the bottom of the groove 2 other than the parallel portion 13 of the magnetic member is abruptly reduced from the parallel portion 13 of the magnetic member and then gradually decreased.

Further, by using the magnetic substrate 1 of the grooved structure in which the stepwise groove 2 and the V-shaped groove 20 disposed perpendicular therewith at a predetermined interval, it is possible to obtain such a shape of the magnetic member 10 at the surface opposed to the recording medium that the width of the parallel portion 13 of the magnetic member for the return path is substantially equal to the width for the main magnetic pole film 7 as shown in FIG. 5. The thickness of the magnetic material 10 at the bottom of the groove 2, other than the parallel portion 13 of the magnetic material, is gradually reduced from the parallel portion 13 of the magnetic member.

Figure 3C:
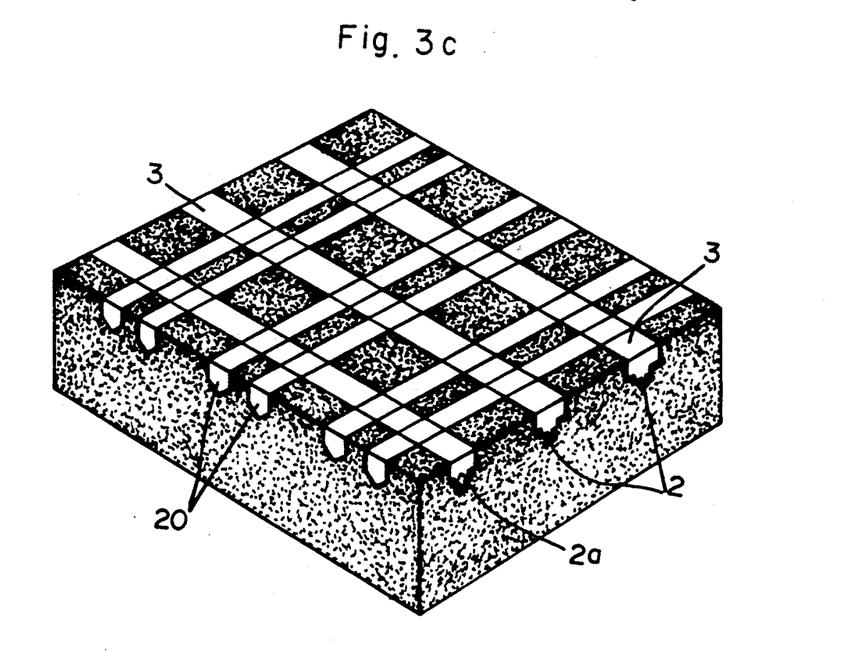
Figure 3D:
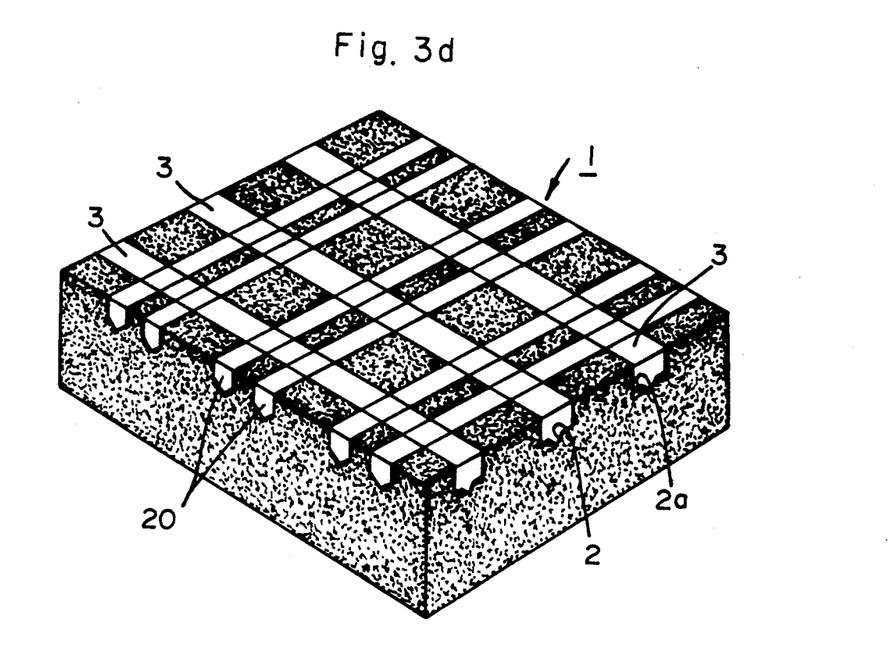

In the present invention, the shape of the stepwise surface 2a formed in the groove 2 disposed in the magnetic member 10 may be in any of the stepwise forms shown in FIGS. 3b and 6. For example, the bottom of the groove 2 may be flat, followed by one step or several steps as shown in FIGS. 3c and 6b, or the rising portion of the stepwise inner surface 2a may be slanted as shown in FIGS. 3d and 6c, and similar effects to those described above may be obtained.

The following is a description of further embodiments of the invention. On a substrate made of Ni—Zn ferrite applied at the surface with precision finishing, a plurality of grooves each of 0.3 mm (w)×0.005 mm (d)×50 mm (1) were formed by machining.

Further, a groove of 0.15 mm (w)×0.025 mm (d)×50 mm (1) was formed by machining near the center for each of the grooves in the longitudinal direction.

Additionally, a plurality of grooves of 0.15 mm (w)×0.05 mm (d)×50 mm (1) were formed by machining perpendicular to the stepwise grooves described above.

After filling glass containing bubbles of greater than 5 um of less than 1/mm$^3$ into the thus obtained stepwise grooved portion, mechanochemical polishing was applied to the main surface and a Cu film, forming a thin film of conductor coils, was formed by sputtering, and then patterned into a predetermined shape.

Then, after depositing $SiO_2$ as an inter-layer insulation film for electrical insulation by means of sputtering, diamond polishing was applied to the surface under the conditions described below to flatten the surface to a roughness of less than 55 Angstroms.

Then, after forming a return path to the inter-layer insulation film by means of ion etching, mechanochemical polishing was applied to the entire main surface under the conditions also described below.

Thus, a surface roughness of less than 30 Angstroms was attained for the inter-layer insulation film and for the exposed surface of the magnetic member.

After mechanochemical polishing, a main magnetic pole film comprising a Co-based amorphous material was deposited and patterned by a sputtering process. Further, a thick main magnetic pole film comprising a Co-based amorphous material was deposited and patterned by sputtering. Additionally, a head protection film comprising $Al_2O_3$ was deposited to laminate the structure.

A perpendicular thin film head was manufactured by subsequently cutting the substrate into a predetermined size and shape such that one main surface of the magnetic member for the return path opposed to the recording medium is stepwise. The end face of the lamination opposed to the recording medium has a trapezoidal shape in which the width at the upper portion of the magnetic member is equal to the width of the main magnetic film, and the width of the lower portion of the magnetic member is greater than the width of the upper portion.

For a comparison of the characteristics of the perpendicular thin film head of the invention, another perpendicular thin film head was manufactured by the same method as described above but using a Ni—Zn substrate filled with glass into a groove of 0.3 mm (w)×0.025 mm (d), which was evaluated in the same way. The track width was 50 um for each of the heads.

Figure 7:
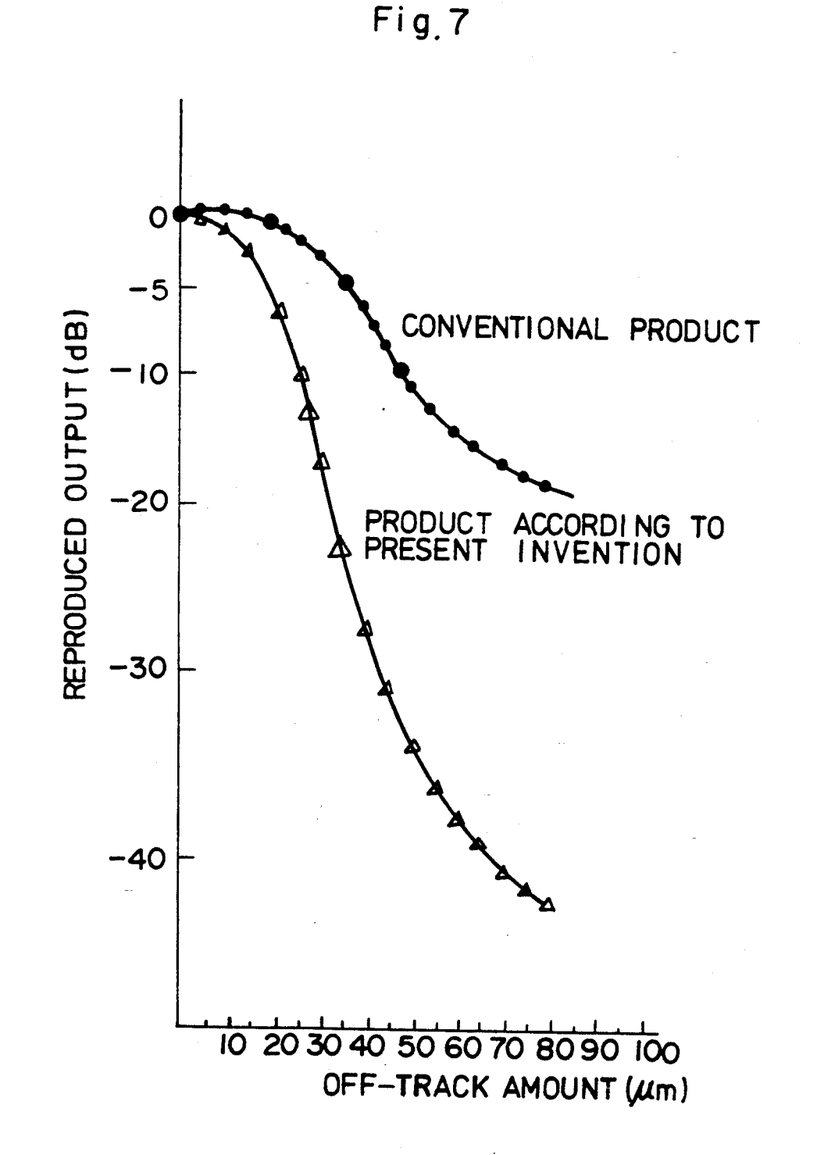
FIG. 7 is a graph showing a relationship between the off-track amount and the reproduced output in the magnetic thin film head.

FIG. 7 shows the results of the test for the off-track characteristics obtained from the two kinds of heads having a different shape of grooves.

The off-track characteristics were measured for the identical head used for recording, and reproduction was conducted by deviating each by 5 um from the recording track and the relative output based on the reproduced output with no deviation was evaluated in dB.

As shown in FIG. 7, the head according to the invention shows excellent off-track characteristics. Additionally, although a sub-peak due to the contour effect was developed in a conventional thin film magnetic head having a flat-bottom groove structure shown in FIG. 8, the development of the sub-peak due to the contour effect was remarkably reduced in the magnetic thin film head according to the present invention having the stepwise groove as shown in FIG. 2.

The measuring conditions for the off-track characteristics were:

Head: Track width Tw=50 um both in the head of the present invention and the conventional head.
Medium: Co—Cr/Ni—Fe double layer film, $H_{CL}=1000$ Oe.
Conditions:
Relative velocity: 15 mm/sec
Density: 1 KFRPI
The conditions for Mechanochemical polishing were:
Machine used: 15 inch MCP disc
Polisher: Non-woven fabric
Powder: MgO with less than 0.02 um of grain size.
RPM: 20 rpm
Pressure: 0.5 kg/mm$^2$
The conditions for diamond polishing were:
Machine used: Single side lap disc of 15 inch dia.
Polisher: Sn disc
Diamond powder: 0.5-1 um of grain size
RPM: 30 rpm
Pressure: 0.5 kg/mm$^2$
The measuring conditions for the reproduced output waveform were:
Disk RPM 3600 rpm
Medium: Co—Cr/Ni—Fe
Recording frequency: 1 MHz
Recording current: 20 mAp-P
Relative velocity: v=15 m/S It is understood that the above described invention may be modified by those skilled in the magentic thin film head art; however the invention is to be limited only by the following claims and the scope of the invention as determined by the equivalents of the elements set forth therein.

What is claimed is:

1. A perpendicular magnetic recording/reproducing thin film head of the single pole type, comprising:
   a magnetic member provided on its main surface with a grooved portion having a stepwise bottom, and a non-magnetic material filled in the grooves of said grooved portion;
   thin film conductor coils;
   an inter-layer insulation film and a main magnetic pole film, wherein at least said thin film conductor coils, said inter-layer insulation film and said main magnetic pole film are laminated on the magnetic member to form a return path;
   the magnetic member and said main magnetic pole film are connected at said return path and said thin film head has an exposed laminated end face opposed to a recording medium; and
   said magnetic member forming a return path appears on said exposed laminated end face and is formed with a portion having the same width as that of said main magnetic pole film and arranged in parallel with said main magnetic pole film and a further portion having an inclined surface thickness gradually reducing from the parallel portion of the magnetic member.

2. A head as defined in claim 1, wherein the magnetic member forming the return path comprises Ni—Zn ferrite.

3. A head as defined in claim 1, wherein the magnetic member forming the return path comprises Mn—Zn ferrite.

4. A head as defined in claim 3, further comprising an insulation layer formed on the surface of the magnetic member for forming the return path comprising Mn—Zn series ferrite before the formation of the thin film conductor coil layer.

5. A head as defined in claim 1, wherein the stepwise grooved portion is formed with a plurality of steps, each having a flat bottom portion.

6. A head as defined in claim 1, wherein the stepwise grooved portion is inclined at the rising portion of the stepwise surface.

7. A head as defined in claim 1, wherein the non-magnetic material filled in the grooves is selected from the group comprising $SiO_2$, $Al_2O_3$ or barium titanate.

8. A head as defined in claim 1, wherein the thin film conductor coils comprise an element from the group comprising Au, Cu, Cr or Al.

9. A head as defined in claim 1, wherein the inter-layer insulation film for electrical insulation between the thin film conductor coil layer and the main magnetic pole film to be deposited subsequently comprises an inorganic oxide such as $SiO_2$ or $Al_2O_3$.

10. A head as defined in claim 9, wherein the inter-layer insulation is formed by means of sputtering.

11. A head as defined in claim 1, wherein the return path for connecting the main magnetic pole film and the magnetic member are formed by applying ion etching or chemical etching to the interlayer insulation film.

12. A head as defined in claim 1, wherein a deformed layer is removed from the surface of the inter-layer insulation film and the surface of the magnetic member for the return path is formed by means of mechanochemical polishing into a strain-free state and has a surface roughness of less than 100 Angstroms.

13. A head as defined in claim 12, wherein the surface roughness is less than 40 Angstroms.

14. A head as defined in claim 1, wherein the main magnetic pole film comprises a substance from the group comprising permalloy, sendust or an amorphous material.

15. A head as defined in claim 14, wherein the main magnetic pole film is formed by means of processes from the group comprising sputtering, vapor deposition or plating.

16. A head as defined in claim 1, wherein a thick main magnetic pole film formed by deposition on the main magnetic pole film by a process from the group comprising sputtering, vapor deposition, or plating for preventing the magnetic saturation of the main magnetic pole.

* * * * *